(12) United States Patent
Lee

(10) Patent No.: US 7,887,364 B2
(45) Date of Patent: Feb. 15, 2011

(54) COAXIAL CABLE ADAPTER

(75) Inventor: Chung-Yu Lee, Taipei County (TW)

(73) Assignee: Edali Industrial Corporation, Taipei County (TW)

( * ) Notice: Subject to any disclaimer, the term of this patent is extended or adjusted under 35 U.S.C. 154(b) by 78 days.

(21) Appl. No.: 12/420,452

(22) Filed: Apr. 8, 2009

(65) Prior Publication Data

US 2010/0259038 A1 Oct. 14, 2010

(51) Int. Cl.
*H01R 9/05* (2006.01)
(52) U.S. Cl. .......................... 439/578; 439/584
(58) Field of Classification Search ........... 439/584, 439/274, 275, 578, 583; 285/49
See application file for complete search history.

(56) References Cited

U.S. PATENT DOCUMENTS 3,920,270 A * 11/1975 Babb, Jr. ................. 285/104
6,679,730 B2 * 1/2004 Dye et al. ................ 439/606
7,070,448 B2 * 7/2006 Khemakhem ............ 439/580
7,396,249 B2 * 7/2008 Kauffman ................ 439/349
7,527,524 B1 * 5/2009 Coleman et al. ......... 439/578

* cited by examiner

*Primary Examiner*—Michael C Zarroli
(74) *Attorney, Agent, or Firm*—Rabin & Berdo, P.C.

(57) ABSTRACT

A coaxial cable adapter includes: an outer sleeve pipe, having an inserting slot with a straight aperture disposed therein; a rubber gasket, formed by a straight cylindrical soft rubber, and disposed in the inserting slot of the outer sleeve pipe; and an inner sleeve pipe, having a metal locking head and a plastic cylindrical pushing pipe respectively disposed on two ends of a central pipe, in which one end of the central pipe extends out of the pushing pipe. When the inner sleeve pipe and the outer sleeve pipe are joined, the soft rubber gasket is deformed and filled in the gaps of the adapter to wrap a cable, thereby achieving a better inner waterproofness. Meanwhile, as the adapter has an entirely metal case, its strength is also enhanced.

5 Claims, 10 Drawing Sheets

COAXIAL CABLE ADAPTER

BACKGROUND OF THE INVENTION

1. Field of Invention

The present invention relates to a coaxial cable adapter for signal transmission, which is provided with a soft rubber gasket disposed therein and has desirable waterproofness and strength.

2. Related Art

In order to connect coaxial cables on two ends, a coaxial cable adapter is usually disposed on an end portion of the cable. Referring to FIGS. 1 and 2, the structure of a first conventional coaxial cable adapter is shown. The adapter has a metal sleeve pipe 10 and an exposed plastic sleeve member 13. A movable joint 11 is disposed on an outer end of the metal sleeve pipe 10, and a sleeve barrel 12 is enchased on an inner end thereof, in which embossed grains are disposed on a central outer ring of the sleeve barrel 12 so as to be conveniently held. In an aperture of an inner end of the sleeve barrel 12, an inclined depressed ring slot 121 with a taper is opened inwards at a small distance away from the end portion. When joined to the plastic sleeve member 13, the inclined depressed ring slot 121 strongly forces the plastic sleeve member 13, such that when an end portion 131 of the plastic sleeve member 13 is inserted into the aperture of the sleeve barrel 12, the end portion 131 is pressed by the inclined depressed ring slot 121 and is thus deformed. As a result, the squeezed material at the end portion 131 of the plastic sleeve member 13 is embedded in the inclined depressed ring slot 121, and the plastic sleeve member 13 is pivoted at the end portion of the adapter. Thereby, the first conventional structure is completed.

For a second conventional structure, referring to FIG. 3, another type of an adapter is shown, and the principle of this structure is quite similar to the first one. A movable joint 30 and a sleeve barrel 32 are disposed on two ends of the adapter, and a plastic sleeve member 31 is disposed on the center. The joining between one end of the plastic sleeve member 31 and the sleeve barrel 32 is similar to the structure in FIG. 2, and the details will not be described herein again.

The aforementioned two conventional adapters have the following disadvantages in manufacturing and use.

1. In the conventional structure, the deformable plastic sleeve member is exposed, i.e., the plastic sleeve member itself is a part of the case of the adapter, so that the case of the adapter may easily crack when exposed to the sun and rain or experiencing a temperature difference for a long time.

2. As the thinner and fragile end portion of the plastic sleeve member is squeezed to be joined to the sleeve barrel, not only the strength of the joining is poor, but the joined members may easily fall off. Further, during the manufacturing, if the squeeze is forced, the plastic sleeve member usually cracks when rotationally pressed by the inclined depressed ring slot with a taper, thus resulting in rejected products, which is another disadvantage of the prior art.

3. Being a part of the case of the adapter, the plastic sleeve member has certain hardness. However, the hardness is inversely proportional to the tightness of the inner line, such that the waterproofness and adhesiveness of the adapter are poor, which is still another disadvantage of the prior art.

In view of the above, in the conventional coaxial cable adapter, the plastic sleeve member and the metal part are both disposed outside, thus causing many disadvantages. Therefore, through hard research, an inner wrapping adapter with better performance is provided to satisfy the expectation in the field.

SUMMARY OF THE INVENTION

Accordingly, the present invention is directed to an adapter. The adapter includes: an outer sleeve pipe, having an inserting slot with a straight aperture disposed therein; a rubber gasket, formed by a straight cylindrical soft rubber instead of a conventional rigid plastic, and disposed in the inserting slot of the outer sleeve pipe; and an inner sleeve pipe, having a metal locking head and a plastic cylindrical pushing pipe respectively disposed on two ends of a central pipe, in which one end of the central pipe extends out of the pushing pipe. Thereby, when the inner sleeve pipe and the outer sleeve pipe are joined through the soft rubber gasket, the inner waterproofness of the adapter is improved. Moreover, as the adapter has an entirely metal case, its strength is also enhanced. These are the advantages of the present invention.

The present invention is further directed to an adapter. In this adapter, an internal thread and an external thread matching with each other are respectively disposed in the outer sleeve pipe and the inner sleeve pipe, such that the adapter can be assembled without requiring relatively expensive tools, and also locked more easily to achieve a compact wrapping and desired waterproofness.

BRIEF DESCRIPTION OF THE DRAWINGS

The present invention will become more fully understood from the detailed description given herein below for illustration only, and thus are not limitative of the present invention, and wherein:

FIG. 6 is a cross-sectional view of the present invention when a cable is not inserted in;

FIG. 7 is a cross-sectional view of the present invention when a cable is inserted in;

DETAILED DESCRIPTION OF THE INVENTION

In order to make the content of the present invention comprehensible to the examiner, embodiments accompanied with figures are described in detail below.

Figure 1:
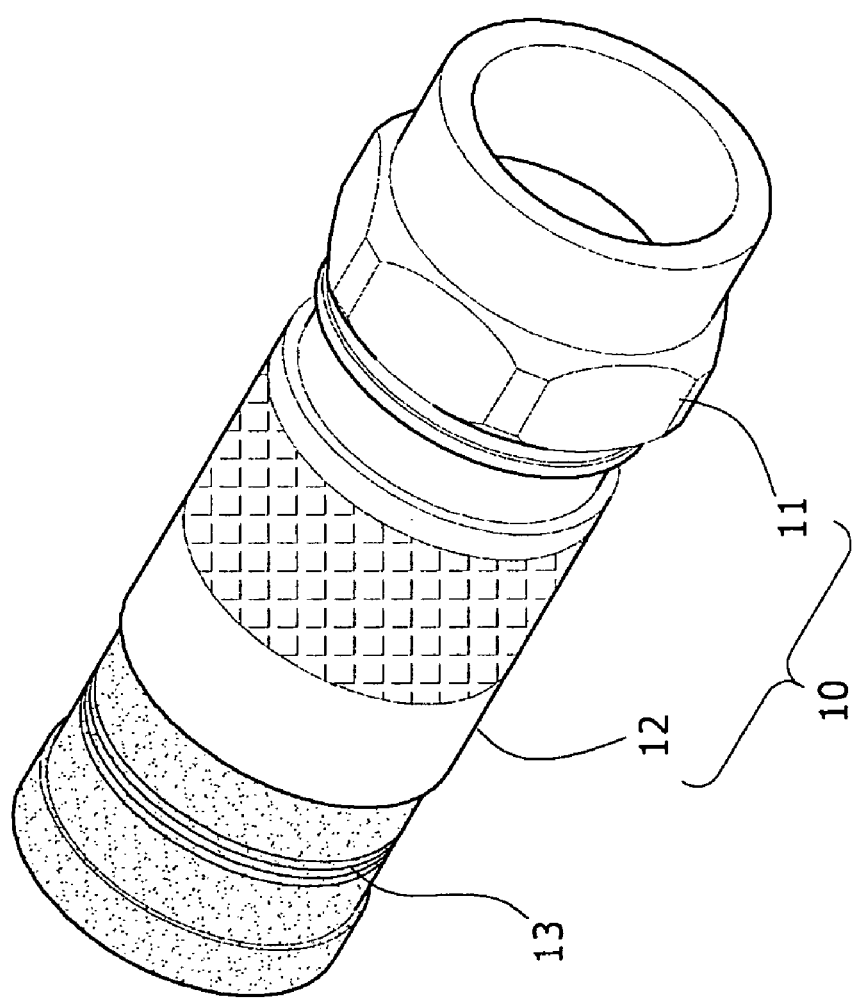
FIG. 1 is an outside view of a first conventional structure.
Figure 2:
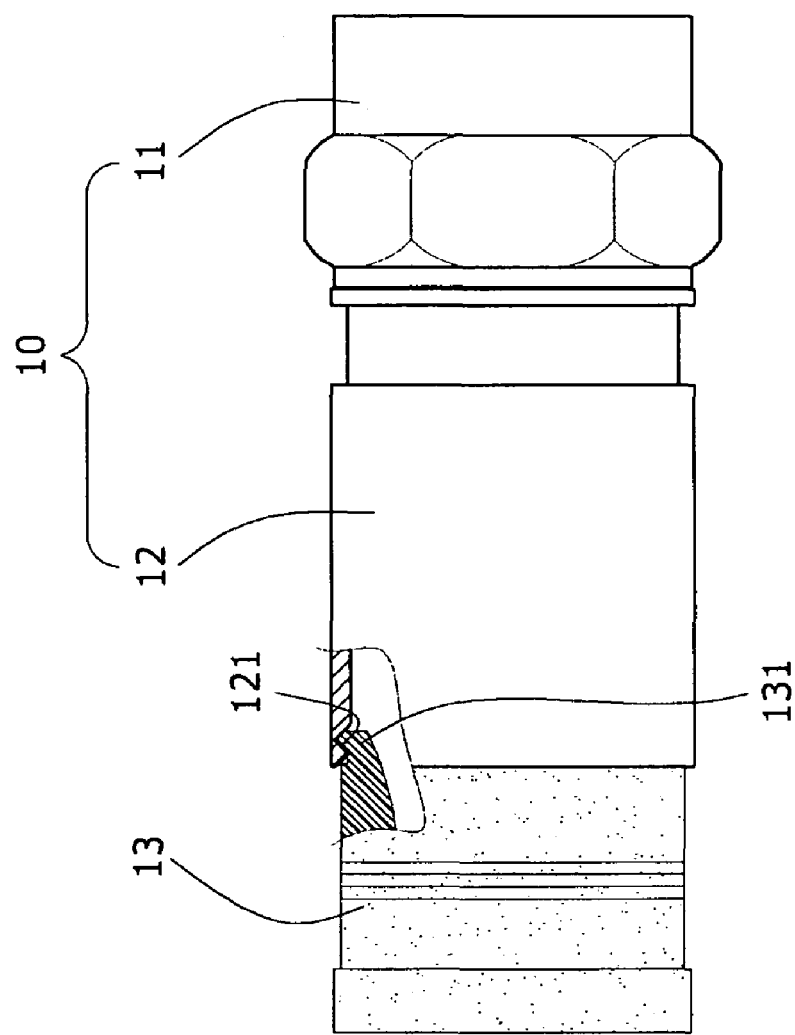
FIG. 2 is an assembled partial cross-sectional view of the first conventional structure.
Figure 3:
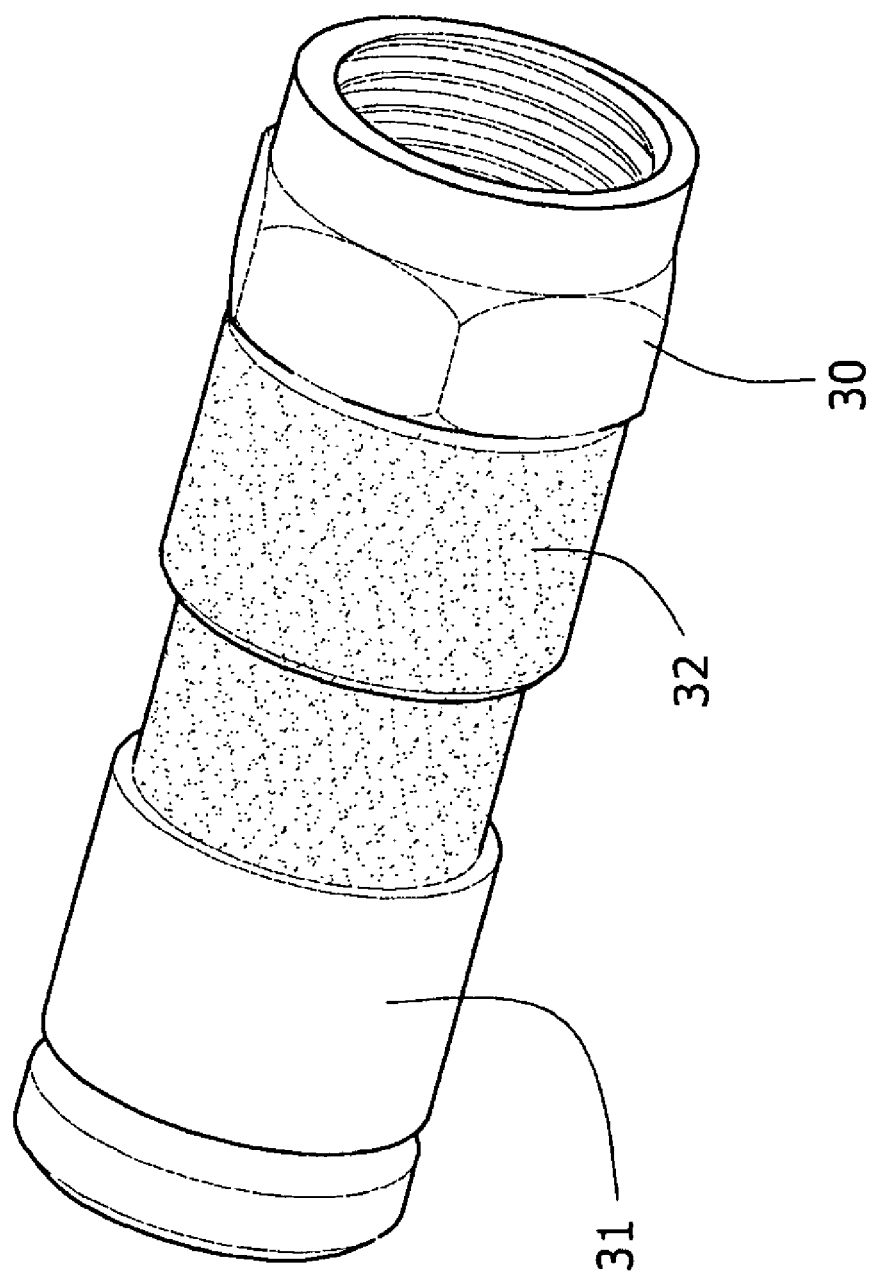
FIG. 3 is an outside view of a second conventional structure.
Figure 4:
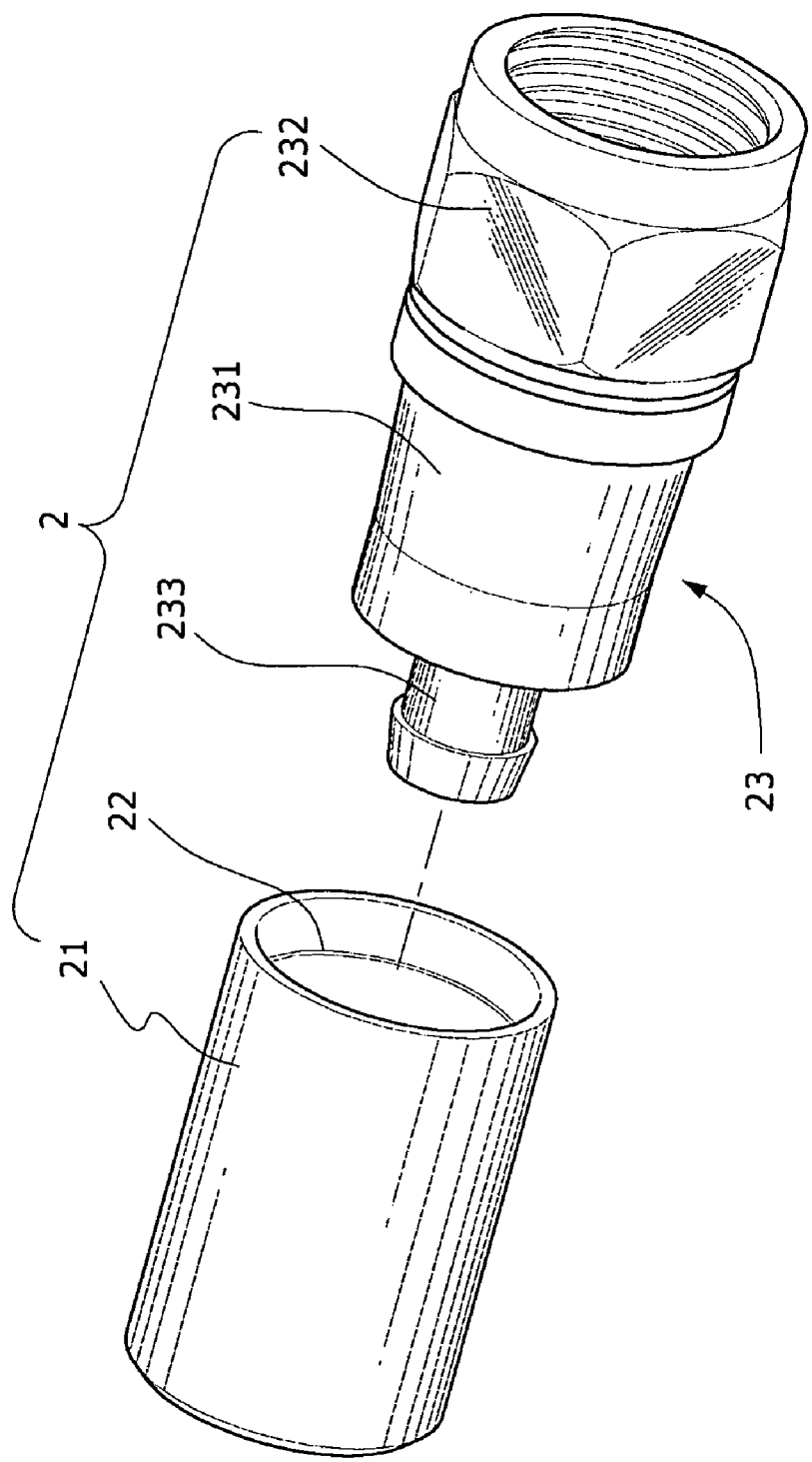
FIG. 4 is an exploded three-dimensional view of the present invention.
Figure 5:
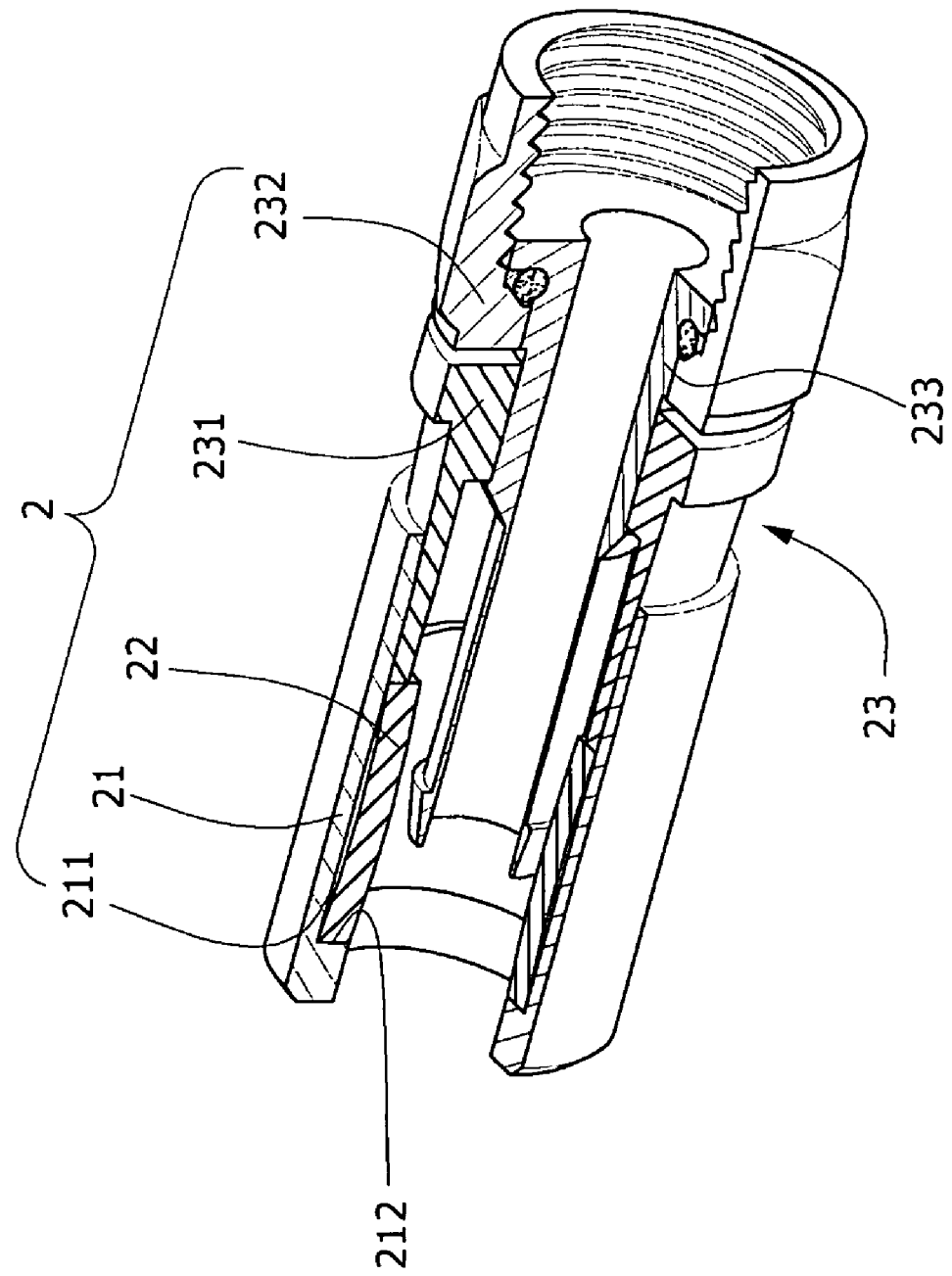
FIG. 5 is a three-dimensional assembled cross-sectional view of the present invention.
Figure 6:
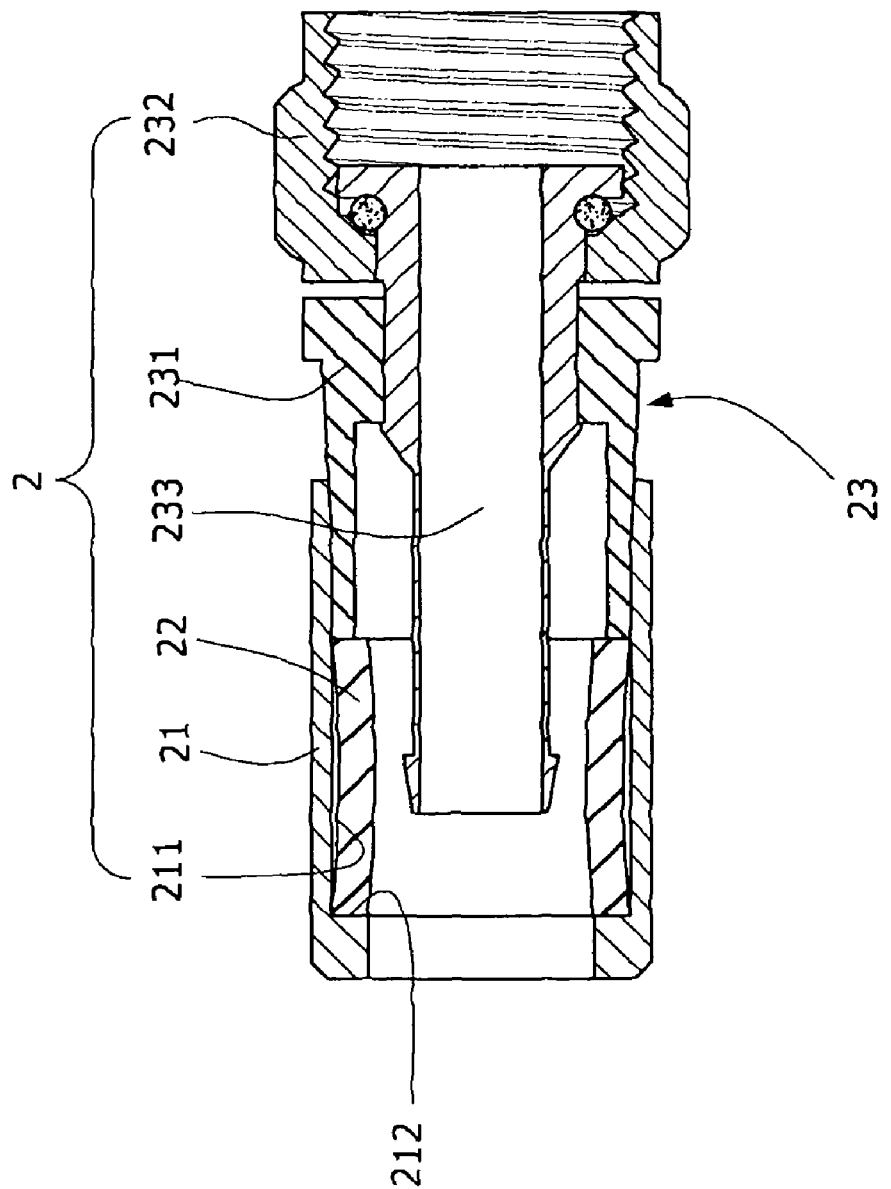

Referring to FIGS. 4, 5, and 6, a coaxial cable adapter 2 of the present invention includes an outer sleeve pipe 21, a rubber gasket 22, and an inner sleeve pipe 23.

The outer sleeve pipe 21 has an inserting slot 211 with a straight aperture disposed therein, and a necking-down portion 212 is disposed on an outer end of the inserting slot 211.

The rubber gasket 22 is formed to be a deformable straight cylindrical tube, and is disposed in the inserting slot 211 of the outer sleeve pipe 21.

The inner sleeve pipe 23 has a metal locking head 232 and a plastic cylindrical pushing pipe 231. The metal locking head 232 is disposed on one end of a central pipe 233, and another end of the central pipe 233 extends out of the plastic cylindrical pushing pipe 231. The plastic cylindrical pushing pipe 231 is disposed the central pipe 233 on a side of the metal locking head 232. When the outer sleeve pipe 21 receives the inner sleeve pipe 23, the rubber gasket 22 is pressed and deformed, and the plastic cylindrical pushing pipe 231 is inserted between the inserting slot 211 and a portion of the deformed rubber gasket 22.

Figure 7:
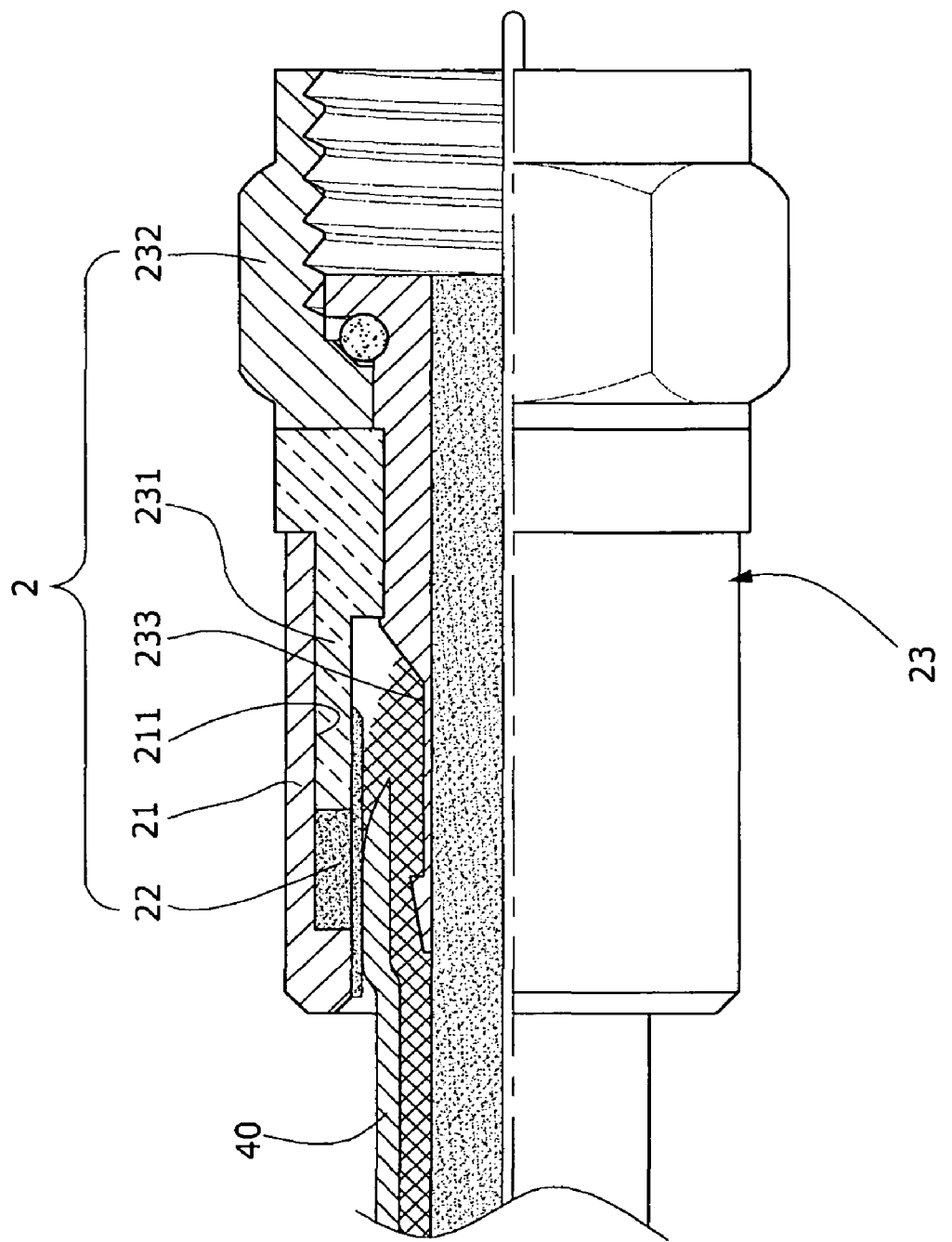

When the outer sleeve pipe 21 and the inner sleeve pipe 23 are pressed by a tool to be joined, referring to FIGS. 5 and 6, the central pipe 233 extending from one end of the inner sleeve pipe 23 and the pushing pipe 231 are inserted into the inserting slot 211, and pressed against an end portion of the rubber gasket 22, such that the rubber gasket 22 is elastically deformed towards the central pipe 233 and is thus slightly raised. Referring to FIG. 7, if the raised rubber gasket 22 is continuously pressed by the pushing pipe 231, and is meanwhile stopped by a cable 40 already assembled therein, the rubber gasket 22 is deformed towards the gaps so as to entirely wrap the cable 40, thus achieving a better protection, a tighter joining, and a more desired waterproofness.

Figure 8:
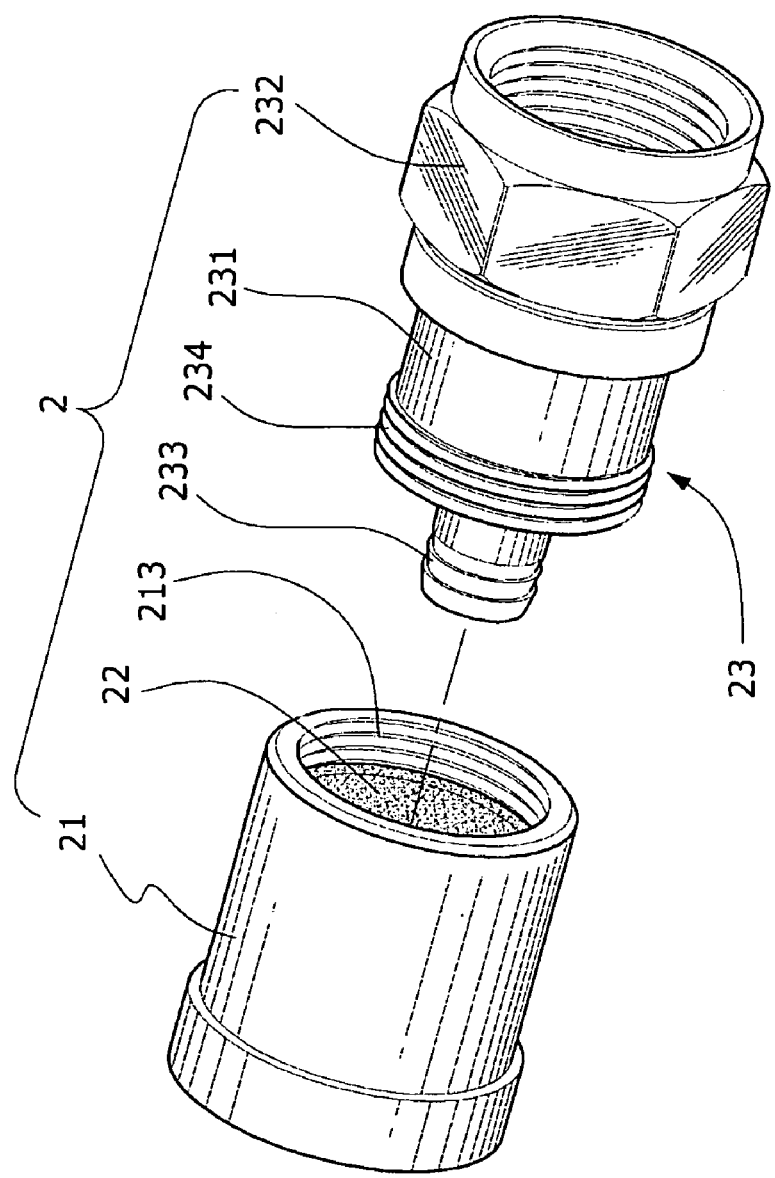
FIG. 8 is an exploded structural view of a second embodiment of the present invention.
Figure 9:
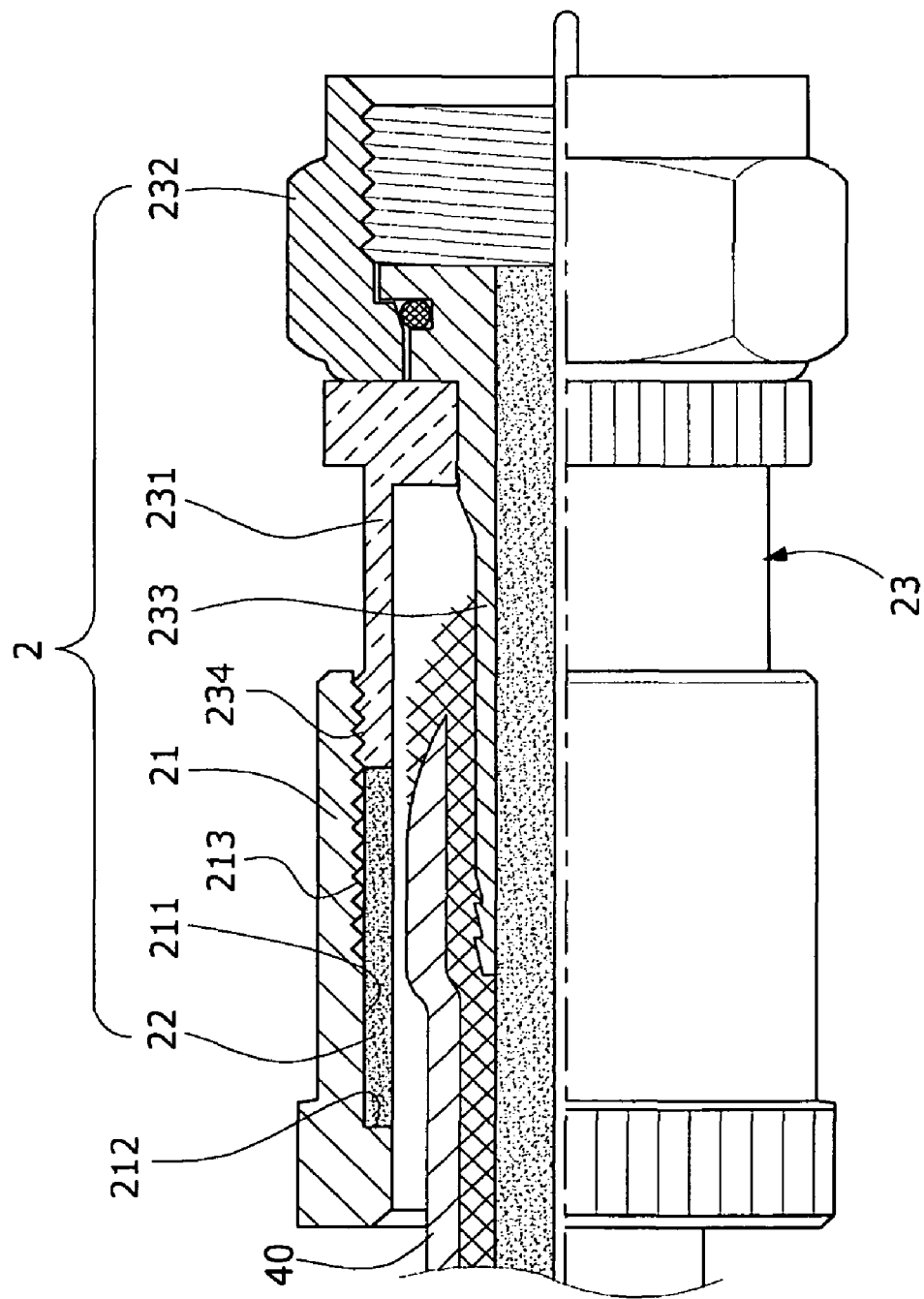
FIG. 9 is a cross-sectional view of the second embodiment of the present invention before pressing.

Referring to FIGS. 8 and 9, another embodiment of the present invention is shown. The coaxial cable adapter includes an outer sleeve pipe 21, a rubber gasket 22, and an inner sleeve pipe 23.

The outer sleeve pipe 21 has an inserting slot 211 with a straight aperture disposed therein. A necking-down portion 212 is disposed on an outer end of the inserting slot 211, and an internal thread 213 is disposed on the other end.

The rubber gasket 22 is formed to be a deformable straight cylindrical tube, and is disposed in the inserting slot 211 of the outer sleeve pipe 21.

The inner sleeve pipe 23 has a metal locking head 232 and a raised plastic cylindrical pushing pipe 231. The metal locking head 232 is disposed on one end of a central pipe 233, and the raised plastic cylindrical pushing pipe 231 is disposed on the central pipe 233 on a side of the metal locking head. An external thread 234 is disposed on an end portion of the pushing pipe 231.

Figure 10:
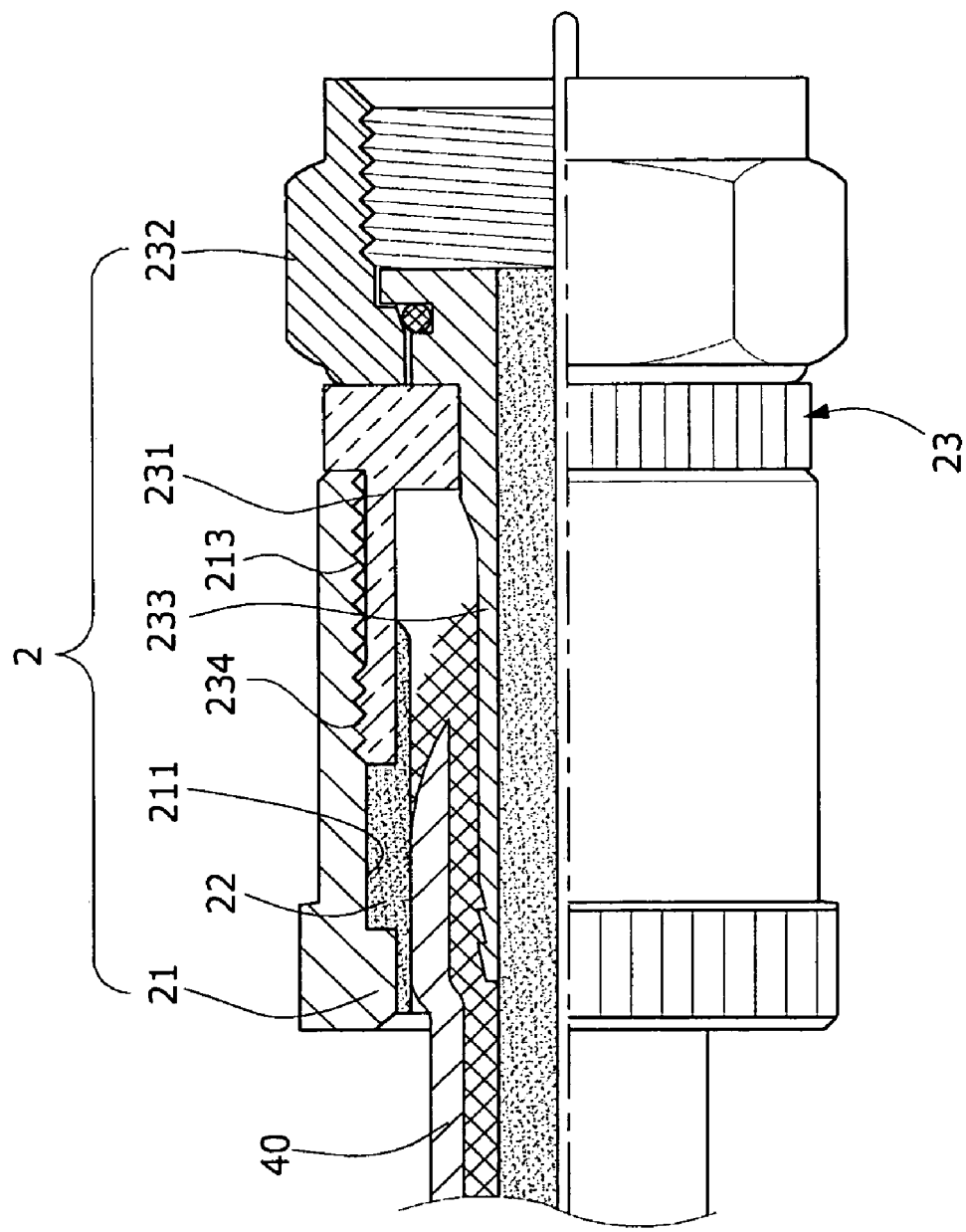
FIG. 10 is a cross-sectional view of the second embodiment of the present invention after pressing.

Referring to FIGS. 9 and 10, when the cable 40 is assembled in the outer sleeve pipe 21, the pushing pipe 231 of the inner sleeve pipe 23 is pushed into the inserting slot 211, and the external thread 234 of the pushing pipe 231 is screwed with the internal thread 213 of the inserting slot 211, so as to be locked by screwing. When the rubber gasket 22 is continuously pressed by the pushing pipe 231, and is meanwhile stopped by the cable 40 therein, the rubber gasket 22 is deformed towards the gaps so as to entirely wrap the cable 40, thus achieving a tighter joining and a better waterproofness. Besides, such a joining manner by screwing also reduces the cost of pressing with a tool, and is more convenient in use.

Due to the above sophisticated designs, the present invention achieves the following advantages in practice.

1. In the present invention, as the inserting slot 211 in the outer sleeve pipe 21 is straight, it is not difficult for manufacturing. Meanwhile, the rubber gasket 22 is an elastomer, so that after being closely joined to the inserting slot 211 in the outer sleeve pipe 21, the rubber gasket 22 may not be damaged. Thereby, the cable is effectively wrapped, and a better waterproofness is achieved. Moreover, when the adapter needs to be reassembled (because of a misoperation), the rubber gasket 22 is still a complete piece and can be reused, such that the cost is lowered. This is an advantage of the present invention.

2. In the present invention, the pushing pipe 231 of the inner sleeve pipe 23 is plastic, and accordingly the rubber gasket 22 is made of rubber, thus achieving a better adhesiveness and meanwhile obtaining a lighter weight, which is another advantage of the present invention.

3. As the rubber gasket 22 is of a pure cylindrical structure, the conventional rigid plastic is not required, and the tapering or squeezing process is not performed, so that the manufacturing is simplified and the product yield is increased, which is another advantage of the present invention.

4. In the present invention, the internal thread 213 and the external thread 234 matching with each other are respectively disposed in the outer sleeve pipe 21 and the inner sleeve pipe 23, such that the adapter can be assembled without requiring relatively expensive tools, and also locked more easily to achieve a compact wrapping and desired waterproofness.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

To sum up, due to its novelty, practicability, and industrial utilization value, the present invention conforms to the patent requirements, and is filed with the IPO according to the Patent Law.

What is claimed is:

1. A coaxial cable adapter, comprising:
   an outer sleeve pipe, having an inserting slot with a straight aperture disposed therein;
   a rubber gasket, being a deformable straight cylindrical tube, and disposed in the inserting slot of the outer sleeve pipe;
   a central pipe; and
   an inner sleeve pipe for being received by the outer sleeve pipe, the inner sleeve pipe having a metal locking head disposed on one end of the central pipe and a plastic cylindrical pushing pipe disposed on the central pipe on a side of the metal locking head, wherein
   another end of the central pipe extends out of the pushing pipe and
   when the outer sleeve pipe receives the inner sleeve pipe, the rubber gasket is pressed and deformed, and the plastic cylindrical pushing pipe is inserted between the inserting slot and a portion of the deformed rubber gasket.

2. The coaxial cable adapter according to claim 1, wherein a necking-down portion is disposed on an outer end of the inserting slot.

3. A coaxial cable adapter, comprising:
   an outer sleeve pipe, having an inserting slot with a straight aperture disposed therein, and having an internal thread disposed on one end thereof;
   a rubber gasket, being a deformable straight cylindrical tube, and disposed in the inserting slot of the outer sleeve pipe;
   a central pipe; and
   an inner sleeve pipe, having a metal locking head disposed on one end of the central pipe and a raised plastic cylindrical pushing pipe disposed on the central pipe on a side of the metal locking head, wherein an external thread is disposed on an end portion of the pushing pipe, and the external thread is screwed with the internal thread of the inserting slot in the outer sleeve pipe.

4. The coaxial cable adapter according to claim 3, wherein a necking-down portion is disposed on an outer end of the inserting slot.

5. A coaxial cable adapter, comprising:
   an outer sleeve pipe, having an inserting slot with a straight aperture disposed therein;

a rubber gasket, being a deformable straight cylindrical tube, and disposed in the inserting slot of the outer sleeve pipe;

a central pipe; and an inner sleeve pipe for being received by the outer sleeve pipe, the inner sleeve pipe having a metal locking head disposed on one end of the central pipe and a plastic cylindrical pushing pipe disposed on the central pipe on a side of the metal locking head, wherein another end of the central pipe extends out of the pushing pipe and a necking-down portion is disposed on an outer end of the inserting slot.

* * * * *